United States Patent [19]

Fitz

[11] Patent Number: 4,747,662

[45] Date of Patent: May 31, 1988

[54] FIBER OPTICS HAVING A LIQUID CORE AND A FLUOROPLASTIC CLADDING

[75] Inventor: Herbert Fitz, Burgjirchen, Fed. Rep. of Germany

[73] Assignee: Hoechst Aktiengesellschaft, Frankfurt am Main, Fed. Rep. of Germany

[21] Appl. No.: 52,051

[22] Filed: May 19, 1987

[30] Foreign Application Priority Data

May 21, 1986 [DE] Fed. Rep. of Germany ....... 3617005

[51] Int. Cl.$^4$ ................................................. G02B 6/20
[52] U.S. Cl. .................................. 350/96.32; 350/96.34
[58] Field of Search ............... 350/96.29, 96.30, 96.32, 350/96.34

[56] References Cited

U.S. PATENT DOCUMENTS

| | | | |
|---|---|---|---|
| Re. 31,868 | 4/1985 | Beasley et al. | 350/96.30 |
| 3,740,113 | 6/1973 | Cass | 350/96.32 |
| 3,995,934 | 12/1976 | Nath | 350/96.32 |
| 4,009,382 | 2/1977 | Nath | 350/96.32 X |
| 4,045,119 | 8/1977 | Eastgate | 350/96.32 |
| 4,201,446 | 5/1980 | Geddes et al. | 350/96.29 |
| 4,373,768 | 2/1983 | Clarke | 350/96.34 |
| 4,505,542 | 3/1985 | Clarke | 350/96.33 |

FOREIGN PATENT DOCUMENTS

| | | | |
|---|---|---|---|
| 2424620 | 12/1975 | Fed. Rep. of Germany | 350/96.32 |
| 2719504 | 11/1978 | Fed. Rep. of Germany | 350/96.32 |
| 2406424 | 5/1983 | Fed. Rep. of Germany | 350/96.32 |
| 613284 | 9/1979 | Switzerland | 350/96.32 |

*Primary Examiner*—William L. Sikes
*Assistant Examiner*—Frank González

[57] ABSTRACT

Fiber optics having a liquid core, which comprises a liquid of high radiation transmission, and a sheath made from a copolymer of vinylidene fluoride which comprises at least 20% by weight and at most 75% by weight of copolymerized units of vinylidene fluoride, and copolymerized units with at least one further fluorine-containing monomer are described. Suitable further monomers are, in particular, hexafluoropropylene, or hexafluoropropylene and tetrafluoroethylene. The fiber optic can, if appropriate, be provided with pigments or other coloring additives. The sheath made from the copolymer of vinylidene fluoride has excellent adhesion to other materials and can therefore easily be bonded to other materials.

9 Claims, No Drawings

FIBER OPTICS HAVING A LIQUID CORE AND A FLUOROPLASTIC CLADDING

The invention relates to fiber optics having a liquid core, which comprises a liquid of high radiation transmission, and a sheath made from a fluorine-containing polymer material.

Fiber optics having a liquid core and a plastic sheath, surrounding these have been disclosed, for example by U.S. Pat. No. 3,740,113, where a sheath material made from a 4-methylpentene homopolymer or copolymer having a refractive index of 1.45 surrounds a light-conducting core made from a liquid whose refractive index is at least 3% higher. Examples of such liquids which may be mentioned are benzyl alcohol or nitrobenzene. Compared to known fiber optics having a solid core—for example light-conducting glass fibers having a cladding—fiber optics having a liquid core have the advantage of better energy transmission, in particular in the case of intensive radiation, and increased flexibility, as is of great importance, for example, for medical applications. The essential disadvantage of the fiber optics constructed according to U.S. Pat. No. 3,740,113 that they are not suitable for transmission of short-wave radiation, in particular in the UV region, since the refractive index of the polymer material is too high for liquids which are transparent to UV radiation still to be employed. The life of such fiber optics is also limited since the liquid dif-fuses into and through the sheath.

U.S. Pat. No. 3,995,934 discloses the use of perfluorinated polymers as sheath material for fiber optics having a liquid core, polytetrafluoroethylene, polytrifluorochloroethylene and the copolymer of tetrafluoroethylene and hexafluoropropylene being mentioned therein. German Patent No. 2,406,424 additionally mentions the use of fluorocarbon resins having alkoxy side chains, these presumably being taken to mean known copolymers of tetrafluoroethylene with perfluoro(alkylvinyl) ethers. These fluoropolymers have refractive indices which are below the value 1.39 and are thus also suitable for fiber optics which are to be used for the transmission of UV radiation. The use of liquids which do not wet the fluoroplastics mentioned for the liquid core of such fiber optics is said to prevent the escape of the liquid through the sheath and increase the long-term stability of such fiber optics.

However, this is faced with a number of critical disadvantages. The fluoroplastics mentioned therein are too crystalline, and therefore attenuation of the radiation to be transmitted is too high, they are relatively stiff and not very flexible, and they are virtually insoluble in common organic solvents. They can therefore not be processed from organic solvents for construction of the sheath layer.

Accordingly, the present invention has the object of providing, for fiber optics having a liquid core, the sheath material which does not have these disadvantages.

This object is achieved by making available a fiber optic, of the type mentioned initially, wherein the fluorine-containing polymer material is a copolymer which comprises 20 to 75% by weight of copolymerized units of vinylidene fluoride and copolymerized units of at least one further fluorine-containing monomer.

This fluorine-containing monomer is, in particular, a perfluoroolefin of the formula $CF_2=CFX$, in which X either denotes F or a straight-chain or branched perfluoroalkyl radical having 1 to 5 carbon atoms, or is a perfluoro(alkylvinyl) ether of the formula $CF_2=CF-O(CF_2)_nCF_3$, in which n is 0 to 4, preferably 2. If appropriate, several of these further fluorine-containing monomers, together with VDF, can also form a terpolymer or a quaternary polymer. The units contained in the copolymer can in this case be randomly distributed through the polymer chain or arranged in blocks From these groups, the copolymers of vinylidene fluoride (VDF) with tetrafluoroethylene (TFE), with hexafluoropropylene (HFP), with perfluoro(alkylvinyl) ethers (PAVE), such as, for example, perfluoro(methylvinyl) ether, perfluoro(ethylvinyl) ether and perfluoro(propylvinyl) ether (PPVE), may be mentioned. The terpolymers and quaternary polymers, such as VDF/HFP/TFE, VDF/HFP/PAVE and VDF/HFP/TFE/PAVE, are included.

The preparation of these copolymers is known to those skilled in the art. For example, copolymers of VDF and TFE are described in U.S. Pat. Nos. 2,468,054, 2,468,664 and 2,471,959, and in British Patent Nos. 827,308 and 1,188,889. Copolymers of VDF and HFP are disclosed, for example by U.S. Pat. Nos. 3,006,881, 3,051,677 and 3,178,399, and by British Patent No. 1,188,889. Copolymers of VDF and PAVE are described in U.S. Pat. No. 3,136,745. Terpolymers of VDF, TFE and HFP are disclosed by U.S. Pat. No. 2,968,649, British Patent No. 1,188,889, German Offenlegungsschrift No. 2,635,402 and European Patent No. 50,437, and those of VDF, TFE and PAVE and those of VDF, HFP and PAVE are disclosed by U.S. Pat. No. 3,235,537. Quaternary polymers of VDF, TFE, HFP and PAVE are described in German Offenlegungsschrift No. 2,457,102 and European Patent No. 2,809. Amongst the copolymers mentioned, the bipolymers of VDF with HFP and the terpolymers of VDF with TFE and HFP are particularly preferred. In such copolymers, for example in the terpolymers comprising VDF/TFE/HFP units, the comonomer units incorporated can be distributed purely randomly in the polymer chain or alternatively arranged specifically in blocks, in the latter case in order to achieve particularly elastic properties. In this fashion, for example, thermoplastics having marked elastomer properties, so-called "thermolastics", can be obtained.

The copolymers of VDF used according to the invention as cladding for the liquid core of the fiber optic have a very low refractive index $n^{25}_D \leq 1.39$, preferably $\leq 1.37$ (measured according to DIN 53 491), which, in a number of representatives, extends down to a value of 1.355. The degree of crystallinity—expressed as the heat of crystallization of the polymer, as measured by the DSC method at a cooling rate of 20° C./minute using a Perkin-Elmer DSC 4 "Differential Scanning Calorimeter" of the copolymers of VDF employed according to the invention is extremely low. The heat of crystallization of these copolymers is at least 30% below the value of the corresponding homopolymer polyvinylidene fluoride, which is, depending on the preparation, about 50 J/g. The VDF copolymers employed according to the invention have a heat of crystallization $\leq 35$ J/g, the range for several of the preferred representatives extending to values which can virtually no longer be measured, that is to say to the virtually completely amorphous state. VDF copolymers which have a heat of crystallization of 5 to 10 J/g are used in particular.

Tubes and claddings made from these copolymers are highly transparent in the visible light region and also in the UV radiation region, and they are stable towards radiation in these regions. They have a very low melting range, which, depending on the type of comonomers employed and their amount ratios, can be 180° down to 80° C. and is preferably 120° to 180° C. For this reason, these copolymers can also easily be molded by thermoplastic molding methods and can be molded into thin-walled tubes of small diameter. Such tubes are highly flexible, so that the fiber optics prepared therefrom are significantly more supple than those made from stiffer fluoropolymers such as PTFE or TFE/HFP copolymer. In addition, the VDF copolymers used according to the invention can easily be welded in the high-frequency region, which means that the liquid-filled tubes for the fiber optics mentioned can easily be sealed The liquid-filled fiber optics sheathed by the VDF copolymers mentioned have, on the external surface of this sheath, good adherence for other flexible materials, by means of which, for example, armoring or reinforcement, for example a metal, glass or textile fiber fabric, or a flexible metal tube can be applied to the VDF copolymer sheath, but a layered structure with other materials also becomes possible in which these VDF copolymers form the inside layer in contact with the liquid. Of particular advantage here is the property of the VDF copolymers in question to be readily soluble in a number of organic solvents, such as, for example, in ketones such as methyl ethyl ketone or methyl isobutyl ketone, in chlorinated and/or fluorinated hydrocarbons, in N-methylpyrrolidone, dimethylformamide, dimethylacetamide, dimethyl sulfoxide or tetrahydrofuran. In this fashion, thin layers of the sheath material can be applied adherently to other materials, for example to the inside of a flexible plastic tube made from materials such as natural rubber, silicone rubber and other synthetic elastomers, soft PVC, polyesters, polyamides or other softened thermoplastics.

If, for certain purposes, it is desired that a rigid construction of such a liquid-filled fiber optic be employed, for example for transmission of large amounts of light for illumination purposes, which requires large cross-sections of the fiber optic, then a rigid cladding for the sheath made from the VDF copolymers mentioned can also be provided. Such a rigid external sheath can comprise, for example, glass, metal or a rigid plastic, such as polymethyl methacrylate or hard PVC. In this case, a tube made from one of the VDF copolymers mentioned can simply be drawn into a pipe of such a rigid material However, a pipe (which can also have a very small diameter) is preferably coated from the inside using the abovementioned solution of a VDF copolymer If appropriate, multilayer structures can also be employed in which the innermost sheath always comprises the VDF copolymers mentioned, but the external layers can then be combinations of rigid materials with one another, of flexible materials with one another or of rigid materials with flexible materials. The outer layer can also have recesses ("windows") in order to permit exit of light at this point.

Furthermore, the sheath materials made from the VDF copolymers mentioned can also easily be stuck or other materials can be embedded therein, for example using conventional epoxy resin adhesives. In this fashion, it is possible, for example, to embed the exit window for the fiber optics, which usually comprise cylinders of special radiationtransparent glasses, easily and liquid-tight in the tubelike sheath of the fiber optic.

The VDF copolymers forming the sheath can be crosslinked if required, in particular subsequently to the shaping of the sheath, whereby the temperature and solvent resistance are increased in a fashion desired according to the shaping. This is usually caused by radiation crosslinking. A previously applied second or further sheath made from a flexible, crosslinkable material can be cocrosslinked during this.

The VDF copolymers serving as sheath materials can be provided with coloring additives, both pigments which cause an opaque pigmentation and dyestuffs which cause transparent colorations and can cause, for example, certain desired light-filter effects, being used. Such pigments and dyestuffs are, for example, titanium dioxide, cobalt blue, chromium(III) oxide or other metal oxides, or, if appropriate, also inorganic luminescent pigments, such as those from the ®Lumilux series from the Riedel de Haen Company, furthermore organic dyestuffs, such as, for example, the "fat" dyestuffs from Hoechst AG, that is to say fat yellow 3G or fat red G or fat blue R etc., or also fluorescent organic dyestuffs such as eosin or fluorescein. The dyestuffs or pigments can be those which are excitable by electromagnetic radiation, that is to say have fluorescent or luminescent properties. In the case of pigmentation or coloration of the sheath material, this can be pigmented or colored throughout the entire material or alternatively only in layers. Finally, the liquid core of the fiber optic can also be provided with a dyestuff in order to achieve particular effects.

This can be of an inorganic or organic nature. When water or alcohols are used as supports, various inorganic salts and the complex compounds thereof can be used, and in the case of organic liquids, various soluble or alternatively insoluble dyestuffs can be used.

The dyestuffs used can be excitable by electromagnetic radiation in the desired fashion, and can have fluorescent or luminescent properties.

The choice of light-transmitting liquids is essentially limited by two criteria: at the high radiation transmission which is, of course, necessary, they must (1) have a refractive index which is at least 0.03 units greater than that of the VDF copolymers employed as sheet material, and (2) they must be inert towards this sheath material, that is to say must neither dissolve nor swell these materials.

So long as they fulfil these conditions, all known lightconducting liquids can be used, thus, for example, paraffins, aromatics, halogenated compounds, alcohol, alcohol ether compounds, solutions of salts in water or heavy water, silicones and others. Aliphatic ethers comprising ethylene glycol units of the formula

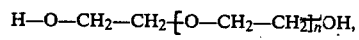

where n is 1 to 3, or silicone oils having a refractive index $n^{20}_D$ of $>1.45$ may be mentioned as specific examples. The cross-section of the fiber optics according to the invention can be round, oval or planar and is not limited to any particular geometry.

The fiber optics, according to the invention, having a liquid core are used, inter alia, for medical purposes, for example in endoscopy, in dental technology, for transmission of light signals and for illumination purposes.

The following examples are intended to illustrate the invention:

EXAMPLE 1

A copolymer made from 60% by weight of vinylidene fluoride and 40% by weight of hexafluoropropylene was processed at 200° C. in a conventional tube extruder into a tube of internal diameter 5 mm and wall thickness 2 mm. The highly transparent tube obtained exhibited the following physical properties:

light transparency of the wall at 400 to 800 nm of 93% (total light)
refractive index $n^{25}_D = 1.367$
heat of crystallization >5 J/g, measured using the DSC method at a cooling rate of 20° C./minute
melting range 80° to 100° C.

After forming the tube into a U-shape having a radius of 10 cm and filling the liquid core with o-xylene, light is fed through the fiber optic at one side of the tube using a cold-light source, type KL 1500, supplied by Schott and Gen., and the light emerging at the other side is measured using a photo cell.

At a measurement length of 500 mm, the light loss between light input and light emergence was less than 20%.

EXAMPLE 2

A commercially available terpolymer, trade name ®Hostaflon TFB from Hoechst AG, comprising 25% by weight of vinylidene fluoride, 15% by weight of hexafluoropropylene and 60% by weight of tetrafluoroethylene having a melting range of 160° to 180° C. was processed on a tube machine at 230° to 250° C. to form a tube of internal diameter 6 mm and wall thickness 1.5 mm. A soft, flexible tube which exhibited a light transmission of greater than 90% in the visible region and a refractive index $n^{25}_D$ of only 1.358 resulted. The degree of crystallization, determined indirectly via the heat of crystallization (DSC/cooling rate 20° C./minute), was near to the value for the amorphous state and exhibited a numerical value of only 5.8 J/g. Corresponding to the measurement arrangement of Example 1, but using a saturated calcium chloride solution in water as the light-transmission liquid, a light yield (=difference between light input and output) of 75% was achieved.

EXAMPLE 3

A terpolymer, comprising 40% by weight of vinylidene fluoride, 40% by weight of tetrafluoroethylene and 20% by weight of hexafluoropropylene and having a melting range of 120° to 130° C., was cast as a 10% strength by weight solution in methyl isobutyl ketone into a film. This had a thickness of 0.1 mm, was highly transparent in the visible and UV radiation region (>95%) and exhibited a refractive index $n^{25}_D$ of 1.355. A glass tube, coated internally with this solution, having a refractive index of 1.46 and a terpolymer coating of thickness 0.1 mm exhibited excellent light-transmission results after filling with liquids having a refractive index >1.40.

In a parallel experiment, a tube was coated with polymethyl methacrylate with the same results.

EXAMPLE 4

A terpolymer, comprising vinylidene fluoride, hexafluoropropene and tetrafluoroethylene units in the weight ratio 20:20:60, was processed into a tube of internal diameter 6 mm and wall thickness 1.5 mm, and subsequently filled with high purity triethylene glycol of the formula $$HO-CH_2-CH_2-O-CH_2-CH_2]_2OH$$

At a measurement length of 1 m, a light yield of 70% was achieved in the visible region (380 to 780 nm).

EXAMPLE 5

Example 4 was repeated, but the tube obtained was filled with triethylene glycol which had been colored with 0.01% of a typical laser fluorescence dyestuff rhodamine 590 supplied by EXCITON Corp./Dayton/USA. After cutting the filled tube to a length of 2 m and sealing with quartz glass stoppers, strong excitation of the dyestuff, usable for illumination purposes, was achieved on excitation with UV light.

I claim:

1. A fiber optic having a liquid core, which comprises a liquid of high radiation transmission, and a sheath made from a fluorine-containing polymer material, wherein this fluorine-containing polymer material is a copolymer which comprises at least 20% by weight and at most 75% by weight of copolymerized units of vinylidene fluoride and copolymerized units of at least one further fluorine-containing monomer.

2. A fiber optic as claimed in claim 1, wherein the copolymer comprises, besides the copolymerized units of vinylidene fluoride, copolymerized units of a perfluoroolefin of formula $CF_2=CFX$, in which X represents F, or a straight-chain or branched perfluoroalkyl radical having 1 to 5 carbon atoms.

3. A fiber optic as claimed in claim 1, wherein the copolymer comprises, besides the copolymerized units of vinylidene fluoride, copolymerized units of a perfluoroolefin of the formula $CF_2=CFX$, in which X represents F or a straight-chain or branched perfluoroalkyl radical having 1 to 5 carbon atoms, and copolymerized units of a perfluoro(alkylvinyl) ether of the formula $CF_2=CF-O-(CF_2)_nCH_3$, in which n is 0 to 4.

4. A fiber optic as claimed in claim 1, wherein the copolymer contains, besides copolymerized units of vinylidene fluoride, copolymerized units of hexafluoropropylene.

5. A fiber optic as claimed in claim 1, wherein the copolymer contains, besides copolymerized units of vinylidene fluoride, copolymerized units of tetrafluoroethylene and of hexafluoropropylene 6. A fiber optic as claimed in claim 1, wherein the sheath of fluorine-containing polymer material is surrounded by at least one sheath of another material.

7. A fiber optic as claimed in claim 1, wherein the copolymer is crosslinked.

8. A fiber optic as claimed in claim 1, wherein the sheath is continuously provided with dyestuffs or pigments, which can be fluorescent or phosphorescent.

9. A fiber optic as claimed in claim 1, wherein the sheath contains layers which are provided with dyestuffs or pigments which can be fluorescent or phosphorescent.

* * * * *